United States Patent [19]

Mukohjima et al.

[11] Patent Number: 4,771,203

[45] Date of Patent: Sep. 13, 1988

[54] VIBRATION WAVE MOTOR

[75] Inventors: Hitoshi Mukohjima; Ichiro Okumura, both of Yokohama; Tohru Kawai, Kawasaki; Takayuki Hirano, Tokyo, all of Japan

[73] Assignee: Canon Kabushiki Kaisha, Tokyo, Japan

[21] Appl. No.: 16,734

[22] Filed: Feb. 20, 1987

[30] Foreign Application Priority Data

Feb. 24, 1986 [JP] Japan ................. 61-038911
Mar. 12, 1986 [JP] Japan ................. 61-054409
Dec. 22, 1986 [JP] Japan ................. 61-306002

[51] Int. Cl.⁴ .......................................... H01L 41/08
[52] U.S. Cl. ..................................... 310/323; 310/328
[58] Field of Search ........................... 310/323, 328

[56] References Cited

U.S. PATENT DOCUMENTS 4,580,073  4/1986  Okumura et al. ................. 310/323
4,645,964  2/1987  Hiramatsu et al. ............. 310/328 X
4,649,311  3/1987  Mukohjima et al. ........... 310/328 X Primary Examiner—Mark O. Budd
Attorney, Agent, or Firm—Fitzpatrick, Cella, Harper & Scinto

[57] ABSTRACT

A vibration wave motor for generating a travelling vibration wave in a vibration member by applying a periodic voltage to an electro-mechanical energy transducer. An anti-movement device is provided to contact the vibration member at a pitch not equal to a multiple of $n\lambda/2$, where n is an integer and $\lambda$ is the wavelength of a vibration wave so that the vibration member is prevented from rotating without reducing the drive efficiency of the motor.

12 Claims, 8 Drawing Sheets

VIBRATION WAVE MOTOR

BACKGROUND OF THE INVENTION

1. Field of the Invention

The present invention relates to a vibration wave motor for driving a movable member by a travelling vibration wave generated on a vibration member, and more particularly to the structure of an anti-rotation lever of the vibration member.

2. Related Background Art

A vibration wave motor translates a vibration motion, created when a periodic voltage is applied to an electrostrictive (or piezoelectric) element functioning as an electromechanical energy transducer, to a rotational motion or linear motion. Since it does not require winding, it is simpler in structure and more compact than a conventional electromagnetic motor, and a high torque is obtainable at a low rotation speed.

FIGS. 3 and 4 illustrate a principle of the drive of a prior art vibration wave motor. FIG. 3 shows generation of the vibration wave of the motor. Numeral 15 denotes a vibration member (which is usually mode of metal material), and two groups of electrostrictive elements 14a and 14b are arranged with an appropriate spacing, that is, to satisfy a phase deviation of $\lambda/4$ to a travelling vibration wave $\lambda$.

In FIG. 3, the vibration member 15 is one electrode of the electrostrictive elements 14a and 14b. and an A.C. voltage.

$$v = V_0 \sin w_0 t \quad (1)$$

is applied to one group of electrostrictive elements 14a from an A.C. power supply 16a, and an A.C. voltage $$v = V_0 \sin(wt \pm \pi/2) \quad (2)$$

having a phase shift of $\lambda/4$ is applied to the other group of electrostrictive elements 14b through a 90° phase shifter 16b so that the travelling vibration wave is generated.

Signs + and − in the formula (1) represent the directions of movement of the movable member 17 and it is selected by the 90° phase shifter 16b as required. In FIG. 3, the 90° phase shifter 16b has been switched to the − position and the voltage $v = V_0 \sin(wt - \pi/2)$ is applied to the electrostrictive elements 14b.

A relationship between the applied A.C. voltage and the generated vibration wave when the A.C. voltage is applied to the electrostrictive elements either singly or in parallel, is explained. Let us assume that the predetermined A.C. voltage (i.e. $v = V_0 \sin wt$) is applied only to the electrostrictive element 14a. A vibration in the form of a standing wave as shown in FIG. 3(a) is generated in the vibration member 15. When the voltage $v = V_0 \sin(wt - \pi/2)$ is applied only to the electrostrictive element 14b, a vibration in the form of a standing wave shown in FIG. 3(b) is generated in the vibration member 15.

On the other hand, when the two A.C. voltages having a phase shift are simultaneously applied to the electrostrictive elements 14a and 14b, the vibration wave travels. The change in time of the travelling vibration wave is shown by FIGS. 3(i)∼3(iv). FIG. 3(i) shows the vibration wave when $t = 2n\pi/w$, FIG. 3(ii) shows the vibration wave when $t = \pi/2w + 2n\pi/w$, FIG. 3(iii) shows the vibration wave when $t = \pi w + 2n\pi/w$, and FIG. 3(iv) shows the vibration wave when $t = 3\pi/2w + 2\pi/w$. A wave front of the vibration wave travels in an x-direction.

The travelling vibration wave thus generated accompanies a longitudinal wave and a lateral wave. More specifically, at any point A on the vibration member 15, it makes a rotating elliptic motion counterclockwise with a longitudinal amplitude u and a lateral amplitude w. Since the movable member 17 is press-contacted to the surface of the vibration member 15 which vibrates as described above, drive forces by the longitudinal amplitude u component of the elliptic motion are applied to the movable member 17 from apexes A, A', ... of the vibration member by the contact (actually surface contact with a certain width) of the vibration plane of the vibration member and the apexes so that the movable member 17 is moved in a direction N (or rotated if the movable member is a rotor).

If the phase is shifted to 90° by the 90° phase shifter 16b, the vibration wave travels in a direction of −x and the movable member 17 is moved oppositely to the direction N.

Since the vibration wave motor frictionally drives the movable member by the vibration of the vibration member, the vibration member is usually resonated in a desired vibration mode so that a large vibration is generated in the vibration member.

A support for the vibration member in the vibration wave motor is usually constructed by merely press-contacting it to a vibration absorbing member such as felt in order to reduce the vibration load of the vibration member as much as possible. With such a construction, however, if the movable member such as a rotor has a heavy load, the vibration member counteracted by the drive of the movable member may be moved oppositely to the drive direction of the movable member. For example, if the above happens in a circumstance where the vibration wave motor is incorporated as drive means for a lens body tube of a one-lens reflex camera, the vibration member deviates from a reference position and control of focus by the vibration wave motor cannot be precisely done.

Several proposals to resolve such a problem have been made (for example, JP-A-201685/1984). In one proposal, the vibration member (a ring-shaped stator) has a comb-shaped contact, an anti-rotation lever (pawl) extending from an appropriate stator is fitted into a comb-shaped slit at a node (or loop) position of a standing wave which would be generated when the A.C. voltage is applied to only one of the electrostrictive elements 14a and 14b.

With the vibration wave motor of such a structure, the anti-movement means of the movable member is attained but another problem explained in FIG. 5 is occurs.

In a vibration wave motor shown in FIG. 5(a), a vibration member 18 comprising a resilient member 11 having a plurality of slits 14 and a piezoelectric element 12 attached to a bottom surface thereof, and a plurality of anti-rotation pawls 13 extending from a stator are fitted to the vibration member. Contact points of the plurality of pawls 13 and the vibration member are designated by $P_1' \sim P_4'$. In the illustrated example, the contact points $P_1' \sim P_4'$ are arranged at each mode Q' defined when it is assumed that the vibration wave generated in the vibration member is a standing wave. Accordingly, the spacing l between the contact points $P_1' \sim P_4'$ is equal to $\frac{1}{2}$ of a wavelength $\lambda$ of the vibration wave. This is shown in FIG. 5(b). In this vibration wave motor, the vibration wave motor actually generated is the travelling wave as explained in FIG. 3(i)~3(iv). Accordingly, as the vibration wave travels, the contact points $P_1' \sim P_4$ come to the position corresponding to a loop R' of the standing wave as shown in FIG. 5(c). This means that even if the contact points $P_1' \sim P_4'$ are arranged at each loop position of the standing wave, the result is substantially same as the case of FIG. 5.

However, if the vibration wave motor has the structure described above, the pawls 13 function as anti-rotation means and also serve as members to prevent vibration of the vibration member 18. Thus, the vibration generated in the vibration member is adversely affected by the pawls which are vibration prevention members. In other words, the pawls cause to be generated a discontinuity point of the vibration wave, and the larger the resistance (load) to the vibration, the higher is the rigidity of the resilient member 11 of the vibration member and the higher is a resonance point of the resilient member. This is a hazard to efficient drive of the vibration wave motor.

The following has been clarified by the inventors of the present invention.

The influence of the vibration resistance by the contact of the anti-rotation means to the vibration member changes with the travel of the travelling vibration wave, and the resonance point of the vibration member changes between FIGS. 5(b) and 5(c). On the other hand, when the vibration wave motor is driven at a high speed, the drive frequency of the motor is constant. As a result, a temporary out-of-resonance point phenomenon occurs and the output is reduced accordingly. The reason for the change of the vibration resistance by the contact of the anti-rotation means is as follows. Assuming that the travelling vibration wave is in the state shown in FIG. 5(b), the minimum amplitude position of the vibration wave corresponds to the contact point with the anti-rotation pawl, and the resistance by the pawl is very small. On the other hand, when the travelling vibration wave is in the state shown in FIG. 5(c), the maximum amplitude position of the vibration wave corresponds to the contact point with the anti-rotation pawl and the resistance of the pawl is very large. As a result, the change of the resistance (load) at the discontinuous point of the vibration wave which is the contact point with the pawl leads to a change of the resonance point which causes the reduction of output.

SUMMARY OF THE INVENTION

It is an object of the present invention to provide a vibration wave motor which eliminates the shortcomings described above, provides for anti-movement of a movable member and minimizes the influences to vibrate of the vibration member.

In accordance with one aspect of the present invention, there is provided a vibration wave motor comprising a vibration member for generating a travelling vibration wave having a wavelength $\lambda$ by applying a periodic voltage to a phasically arranged or polarized electro-mechanical energy transducer, a movable member frictionally driven by the travelling vibration wave, and anti-movement means fitted to a slit formed in the vibration member normal to the direction of travel of the vibration wave, wherein a plurality of such anti-movement means are provided and a spacing between the anti-movement means and a contact position of the vibration means does not correspond to a multiple of $\frac{1}{2}n\lambda$ (n: integer), where $\lambda$ is a wavelength of the travelling vibration wave.

Other objects of the present invention will be apparent from the description of the preferred embodiments made in connection with the drawings.

DETAILED DESCRIPTION OF THE PREFERRED EMBODIMENTS

An embodiment of a rotor type vibration wave motor is explained with reference to the drawings.

Figure 2:
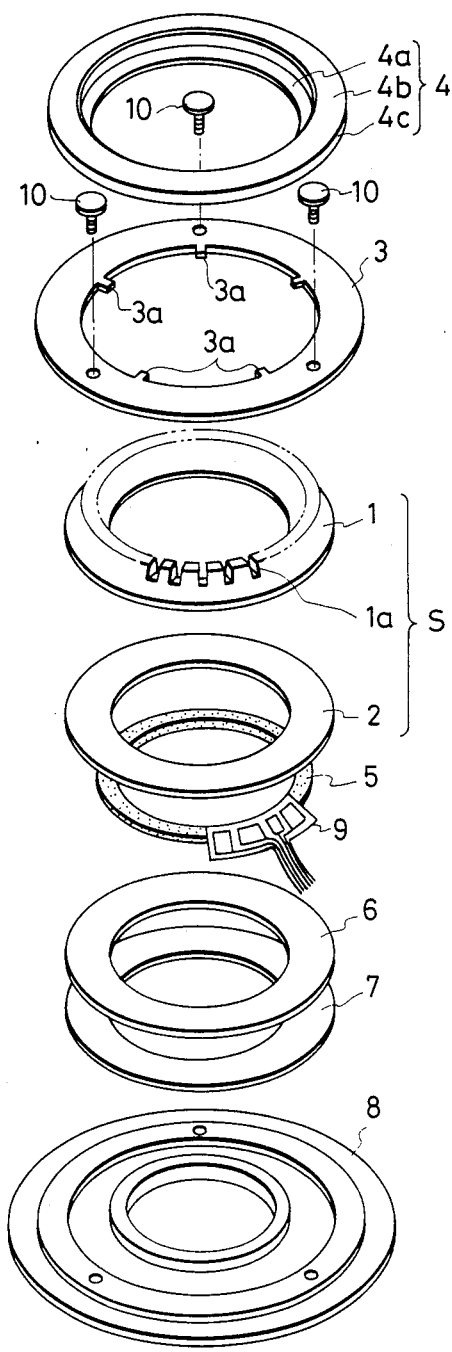
FIG. 2 shows an exploded view of the vibration wave motor.
Figure 3:
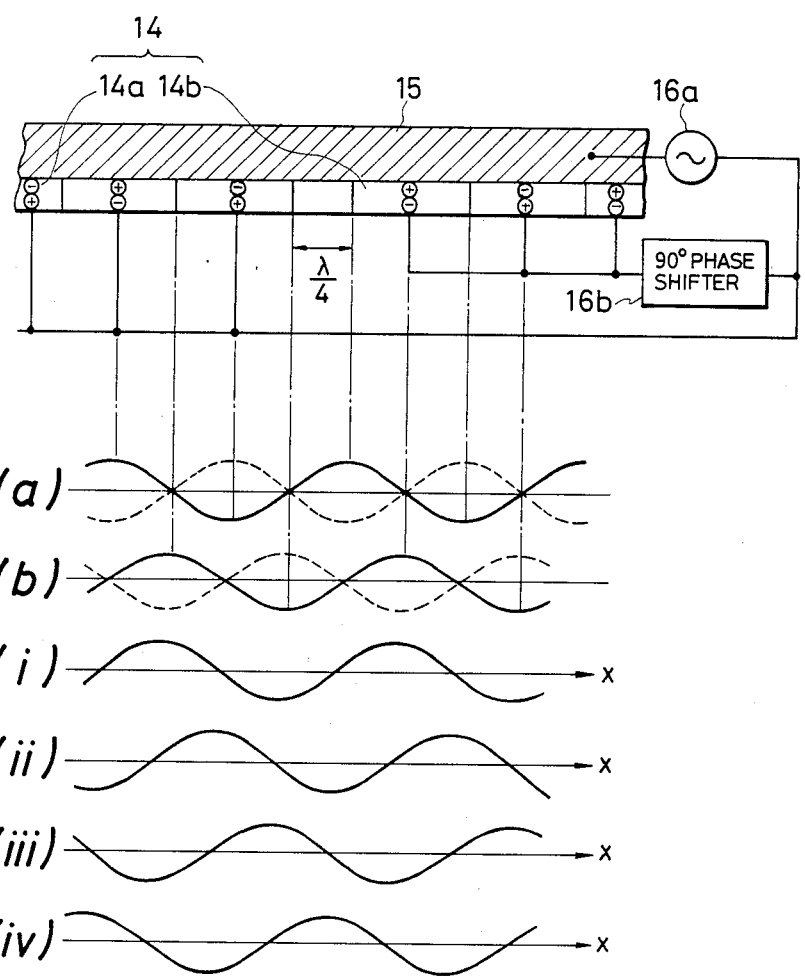
FIG. 3 shows a chart to explain the principle construction and operation of a prior art vibration wave motor.
Figure 4:
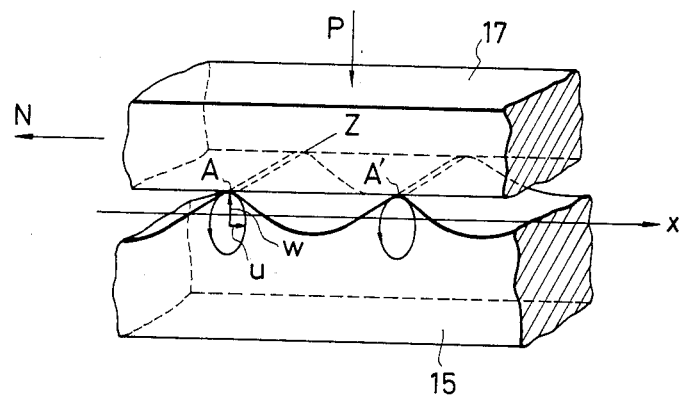
FIG. 4 shows a chart to explain a principle of operation of the vibration wave motor.

FIG. 2 shows an exploded view of a vibration wave motor of the present invention. Numeral 1 denotes a ring-shaped elastic member. It is made of invar. The elastic member 1 has a pedestal sectional area with an upper side thereof being smaller. A plurality of radial slits 1a are formed on the upper surface at a predetermined pitch along the direction of travel of the vibration wave. A piezoelectric element 2 is bonded to a lower surface of the elastic member 1. The piezoelectric element 2 is polarized such that eight travelling vibration waves are circumferentially generated. Numeral 9 denotes a flexible wiring board. Electrodes (A, B, C and S phases) extending from the flexible wiring board 9 are bonded or pressed to an electrode plane on a lower surface of the piezoelectric element 2.

A stator S of the vibration member is constructed by the elastic member 1, piezoelectric element 2 and flexible wiring board 9.

Numeral 3 denotes an anti-rotation (anti-movement) member for preventing circumferential rotation of the stator S. A plurality of inwardly projecting pawls 3a (five pawls in the present embodiment) are formed on an inner edge of the ring at a predetermined pitch. The pawls 3a are fitted to the slits 1a of the elastic member 1. The anti-rotation member 3 is fixed to a bottom base 8 by three bolts 10.

The base 8 supports the entire vibration wave motor. It supports the stator S through a countersunk spring 7, a retainer 6 and a felt member 5 thereon to absorb vibration of the stator S.

Numeral 4 denotes a rotor as a movable member. A thin flange member 4a is arranged on an inner edge of a base 4c, and a lower surface thereof frictionally contacts to the upper surface of the elastic member 1. A vibration absorbing rubber 4b is mounted on the upper surface of the rotor 4 to prevent vibration from being transmitted to an output system (not shown) arranged on the rotor 4. As an example of the vibration absorbing member, the rotor 4 may be pressed to the base 8 by a bearing (not shown).

A characteristic and a principle of operation of the vibration wave motor of the present invention shown in FIG. 2 are now explained.

In the vibration wave motor of the present embodiment, a spacing l between contact points $P_1 \sim P_3$ of the pawls 3a of the anti-rotation member 3 fitted to the slits 1a of the elastic member 1 and the elastic member 1 (that is, the spacing between discontinuity points of the travelling vibration wave) is not a multiple of one half of a wavelength $\lambda$ of the travelling vibration wave, that is, they are prime to each other, as shown in FIG. 1(a). Specifically, the number of travelling waves is 8, the number of slits in the elastic member is 90 (at a constant pitch), and the number of pawls 3a of the anti-rotation member 3 is 5 (at a constant pitch).

When the travelling wave 21 travels from the state shown in FIG. 1(b) to the state shown in FIG. 1(c), the contact point $P_1$ is at $Q_1$ which corresponds to a node of a standing wave in the state of FIG. 1(b), but other contact points $P_2$ and $P_3$ are not on $Q_2 \sim Q_4$. In the state shown in FIG. 1(c), the contact point $P_1$ is at $R_1$ which corresponds to a node of the standing wave but other contact points $P_2$ and $P_3$ are not on $R_2 \sim R_4$. Thus, a total vibration resistance which the whole stator S or vibration member receives from the discontinuity point is substantially the same whether the travelling wave is in the state of FIG. 1(b) or FIG. 1(c).

Figure 5:
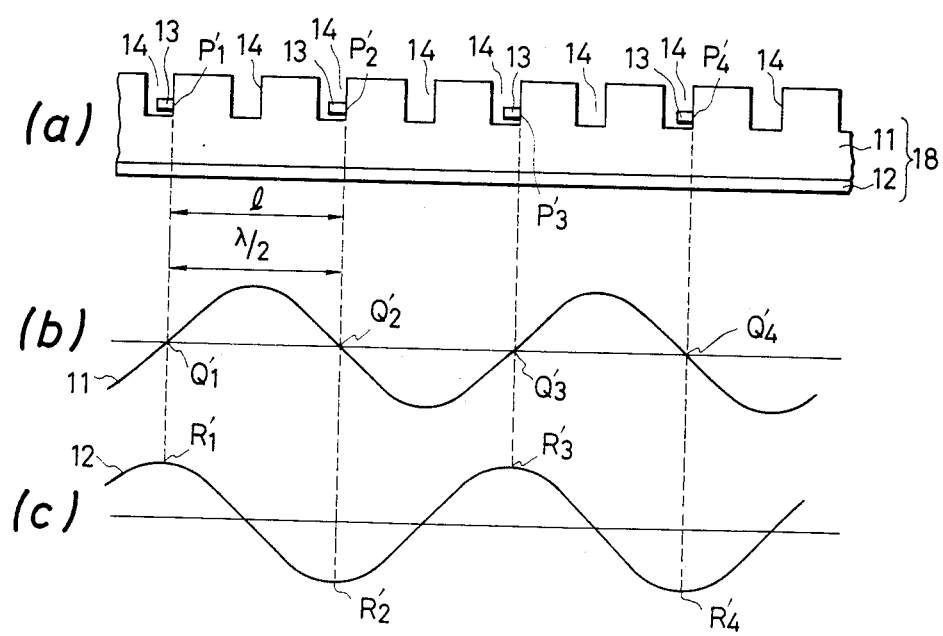
FIG. 5 shows a chart to explain principle construction and operation of another prior art vibration wave motor.

Thus, the change of the total vibration resistance due to the travel of the travelling vibration wave is smaller than that of the vibration wave motor shown in FIG. 5, and the deviation from a resonance point of the vibration member is smaller. As a result, the reduction of the output during the driving of the vibration wave motor is suppressed.

In the vibration wave motor of the present invention, since the vibration resistances at the contact points vary within a range between a maximum and a minimum, the changes of the vibration resistances at the respective contact points are averaged in time and the variation is suppressed so that the deviation from the resonance point is reduced and the reduction of the output is minimized.

Figure 6:
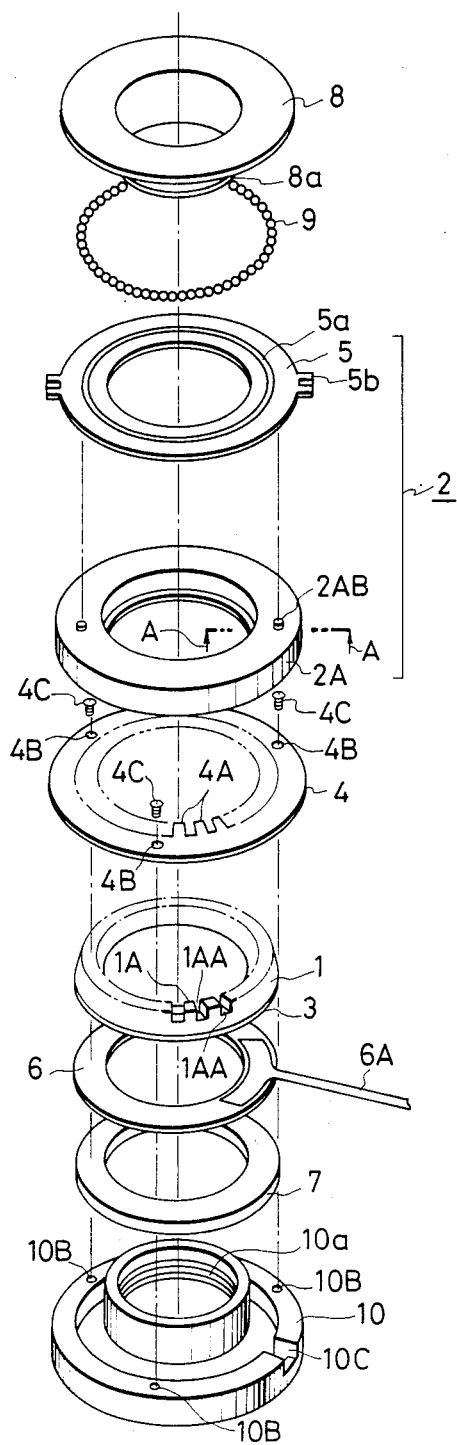
FIG. 6 shows an exploded view of another embodiment of the vibration wave motor of the present invention.
Figure 7:
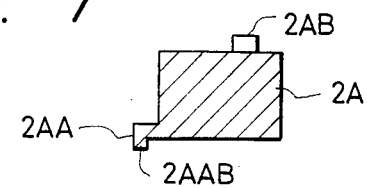
FIG. 7 shows an A—A sectional view of the motor of FIG. 6.

FIG. 6 shows an exploded perspective view of another embodiment of the vibration wave motor of the present invention, and FIG. 7 shows a sectional view of the vibration wave motor taken along line A—A shown in FIG. 6. Numeral 1 denotes an elastic member as a vibration member. A piezoelectric or electrostrictive element 3 as an electro-mechanical transducer is bonded to the bottom of the elastic member 1, in the same manner as that shown in FIG. 2. When two periodic voltages having a phase difference (for example, 90°) therebetween is applied to the piezoelectric or electrostrictive element 3, the elastic member 1 is excited and a travelling wave is generated. Comb-shaped contacts 1A having a plurality of parallelepipeds are formed on the top of the elastic member 1 in order to improve efficiency. Projections 4A of a stator 4 engage slits 1AA of the comb-shaped contacts 1A. The shape of the comb-shaped contacts 1A is not limited to parallelepiped but it may be polygonal, pedestal-shaped, or cylindrical. Numeral 2 denotes a ring-shaped movable member comprising a rotor 2A and a retainer 5 as shown in FIG. 7, the rotor 2A has L-shaped projections 2AA at the bottom thereof, which projections 2A frictionally contact the upper surfaces of the comb-shaped contacts 1A of the elastic member 1, and also has projections 2AB at the top thereof for fixing the retainer 5 to the rotor. The retainer 5 has a groove 5a, recesses 5b for forming output areas of the motor, and recesses (not shown) into which the projections 2AB of the rotor 2A are fitted.

Numeral 6 denotes a vibration absorbing member such as rubber or felt for holding the piezoelectric or electrostrictive element which is the electro-mechanical transducer. A flexible printed circuit board 6A which has conductors to supply the periodic voltages to the electro-mechanical transducer is mounted on the vibration absorbing member 6. Numeral 7 denotes a pressing mechanism for generating contact pressure between the elastic member 1 and the movable member 2.

Numerals 8 and 10 denote hollow holding cylinders for holding the movable member 2 therebetween. The contact pressure between the elastic member 1 and the movable member 2 is adjusted by a thread 8a on the upper holding cylinder 8 and a thread 10b on the lower holding cylinder. Numeral 10c denotes a groove formed in the lower holding cylinder, in which the flexible printed circuit board 6A is buried. The movable member 2 is rotatably held by the groove 5a of the retainer 5 and a bearing 9.

The stator 4 prevents the movement (rotation) of the elastic member 1 which would otherwise be caused by the movement of the movable member 2. The stator 4 has three holes 4B through which it is fixed to the lower holding cylinder 10. The stator 4 is fixed to the lower holding cylinder 10 by bolts 4c which extend to threaded holes 10B of the holding cylinder 10 through the holes 4B. The lower holding cylinder 10 is fixed to a portion of an equipment to which the motor is applied, for example, a portion of an autofocusing lens of a camera. In this case, the recesses 5b of the retainer 5 are engaged with a rotary portion of the lens.

The periodic voltages are applied to the electro-mechanical transducer 3 through the printed circuit board 6A in a known manner so that a travelling vibration wave is generated in the elastic member 1. As a result, the contact 2AAB of the rotor 2A frictionally contacts the comb-shaped contacts 1A formed on the elastic member 1, and the rotor 2A is rotated with the retainer 5 by this frictional contact. As a result, the auto-focusing lens (not shown) to which the motor is applied is driven out or in through the recesses 5b of the retainer 5.

When the rotor 2A is rotated by the friction drive, a counterforce is applied to the elastic member 1 so that the elastic member 1 receives a rotating force and tends to rotate. However, since the projections 4A of the stator 4 (in the present embodiment, the projections 4A are annularly arranged at a pitch shown in FIG. 6 along an inner circumference of the stator 4) engage with the slits 1AA of the elastic member 1, and the stator 4 prevents the rotation by the counterforce of the ring-shaped elasic member 1, the elastic member 1 does not rotate. Accordingly, the rotor 2A is efficiently rotated by the vibration on the elastic member 1.

Figure 8:
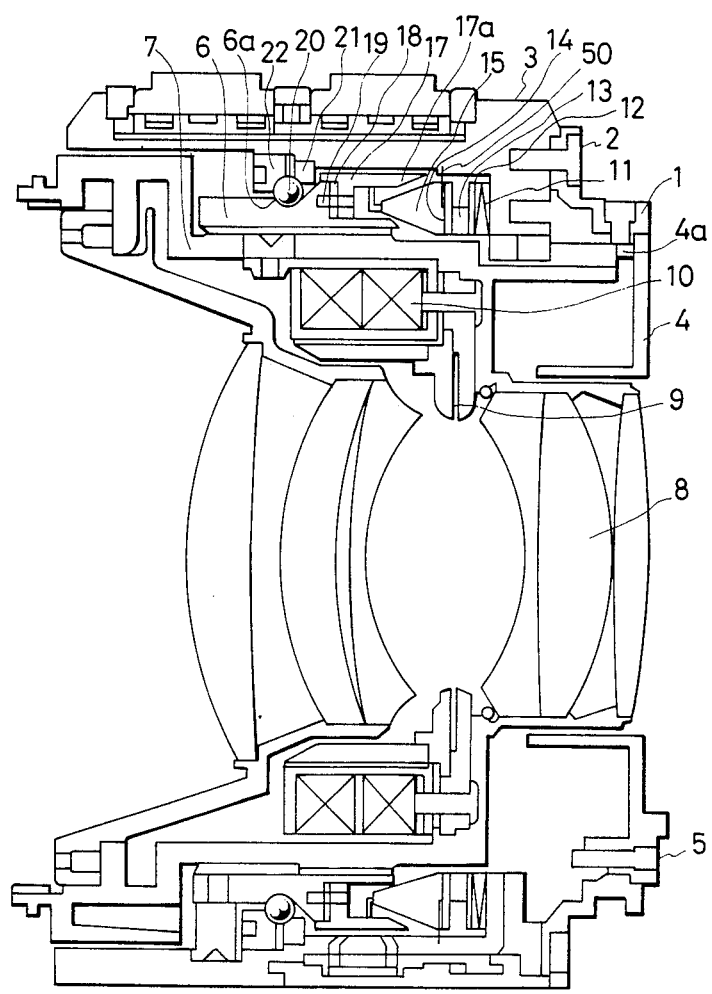
FIG. 8 shows other embodiment of the vibration wave motor of the present invention, in which the motor is arranged in a camera body tube.

FIG. 8 shows another embodiment of the vibration wave motor applied to an exchange lens of a one-lens reflex camera. Numeral 1 denotes a mount to be attached to a lens mount of a camera (not shown), numeral 2 denotes a screw, numeral 3 denotes a fixed tube coupled by the mount 1 and the screw 2, numeral 4 denotes a rear cover resiliently coupled to the mount 1 toward the fixed bodytube 3 by a resilient member 4a, and numeral 5 denotes contacts through which signals are exchanged with the camera.

Numeral 6 denotes a rotary tube having a rotary helicoid screw rotated by the vibration wave motor, and numeral 7 denotes a linearly movable tube threadedly engaged with the rotary helicoid screw.

When the rotaty tube 6 is rotated by the vibration wave motor which will be described later, a lens 8 in the linearly movable tube 7 is advanced to adjust focus. The linearly movable tube 7 has a diaphragm unit 9 which is moved with the lens 8. Numeral 10 denotes a coil of a motor for driving vanes of the diaphragm unit 9, but detailed explanation thereof is omitted because it is not pertinent to the present invention.

Numeral 11 denotes a disk spring which is inserted into the fixed tube 3. A washer 12 and a vibration absorbing member 13 such as felt are stocked on the disk spring 11, and a plurality of electrostrictive elements 14 are phasically arranged on the vibration absorbing member 13, or a phasically polarized electromagnetic element 14 is bonded to an annular vibration member 15 having a pedestal sectional shape. Voltages are applied to the electrostrictive element 14 from a power supply (not shown) to generate a travelling vibration wave in the vibration member 15.

A movable member 17 having a flange 17a is coupled to the rotary tube 6 by a pin 19 through a rubber ring to rotate the rotary tube 6 with the movable member 17 by the travelling vibration wave generated in the vibration member 15. The rotary tube 6 has a V groove 6a, and a plurality of balls 20 are held by a ball receptacle 21, fitted to the fixed tube 3, and a ball retainer 22 threadedly engaged with the fixed tube 3 to reduce a friction resistance of the rotary tube 6 and smoothen the rotation thereof.

As the vibration member 15 is driven by the disk spring 11 in the direction of optical axis, the vibration member 15 press-contacts the movable member 17 having the flange 17a so that the movable member 17 is frictionally driven by the travelling vibration wave generated by the vibration member 15. Numeral 50 denotes an anti-rotation member of the vibration member.

Figure 9A:
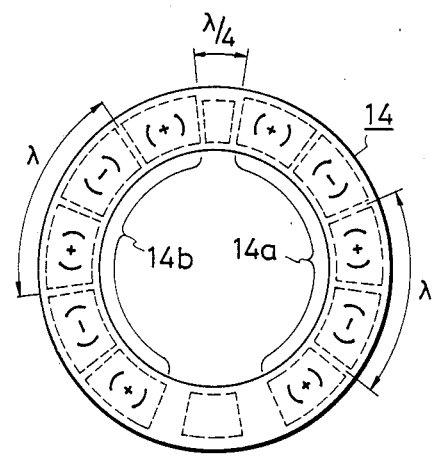
FIGS. 9A, 9B and 9C show front views of an electrostrictive (or piezoelectric) element as an electromechanical energy transducer of the motor of FIG. 8.
Figure 9B:
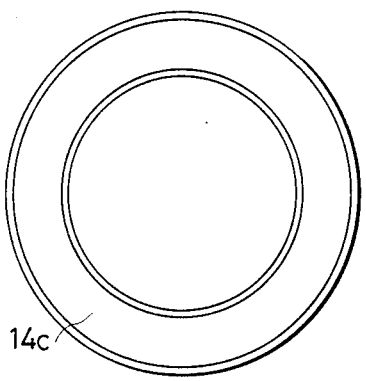
Figure 9C:
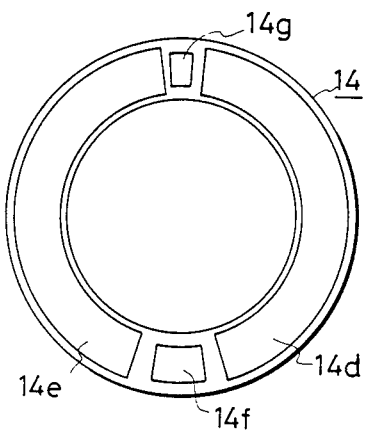

FIG. 9 illustrates polarization of the electrostrictive element 14. As shown in FIG. 9(a), the electrostrictive element 14 has two polarized areas 14a and 14b each having a plurality of polarized portions. The polarized areas 14a and 14b are physically shifted by λ/4, where λ is a wavelength of the vibration wave. Signs (+) and (−) indicate different polarizations. When a voltage is applied, a (+) portion expands and a (−) portion contracts. The length determined by a sum of the (+) portion and the (−) portion corresponds to the wavelength λ which is determined by the input frequency. A circumference of the electrostrictive element 14 is a multiple of the length equal to the sum of the (+) portion and the (−) portion. In the present embodiment, it is six times as long as the sum. In FIG. 9(b), an electrode 14c on the upper surface (facing the vibration member) of the electrostrictive element 14 is grounded, and FIG. 9(c) shows electrode patterns 14d, 14e, 14f and 14g on the lower surface (facing the vibration absorbing member) of the electrostrictive element 14. The electrode 14d is arranged to face the polarization area 14a and the electrode 14e is arranged to face the polarization area 14b. The electrode 14f is a sensor electrode for detecting a resonance frequency. The electrode 14g is grounded and connected to lead wires (not shown) on the lower surface of the electrostrictive element so that voltages are applied to the polarization areas 14a and 14b.

Figure 10:
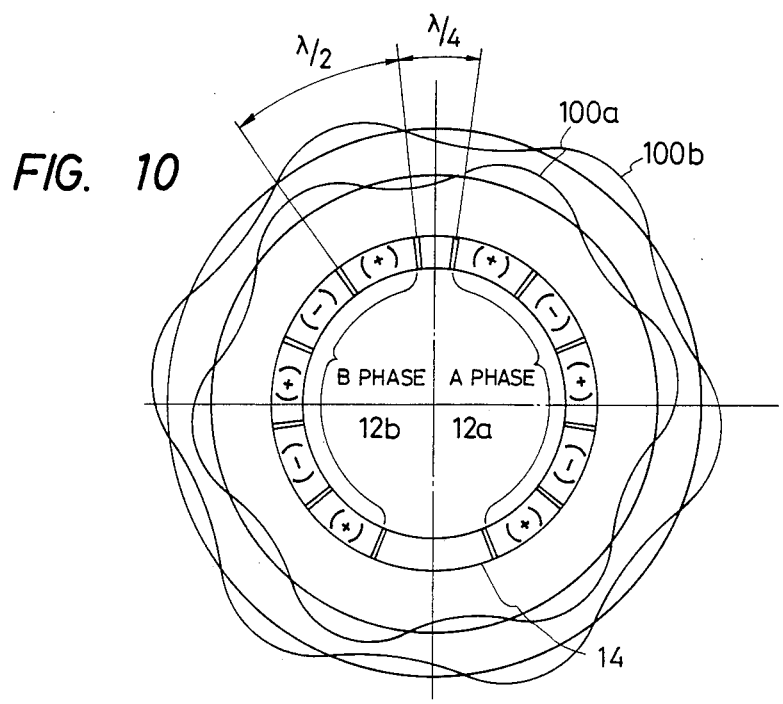
FIG. 10 illustrates a vibration mode of the electrostrictive element.

FIG. 10 shows a plan view of the electrostrictive element 14 and a vibration mode. Sector areas are polarized thick wires with the polarities (+) and (−). An A.C. voltage $V = V_O \sin \omega t$ is applied to the electrostrictive elements 14a of a phase A so that a standing wave 100a of the vibration mode of the phase A is generated. When an A.C. voltage $V = \pm V_O \cos \omega t$ is applied to the electrostrictive elements 14b of a phase B which are phasically shifted by λ/4, a standing wave 100b of the vibration mode of the phase B is generated. By combining those two vibration modes, a travelling vibration wave is generated in the vibration member 15 contacting electrostrictive element 14. By switching the sign + or − of the voltage $V = \pm V_O \cos \omega t$, the direction of travel is changed.

Figure 11:
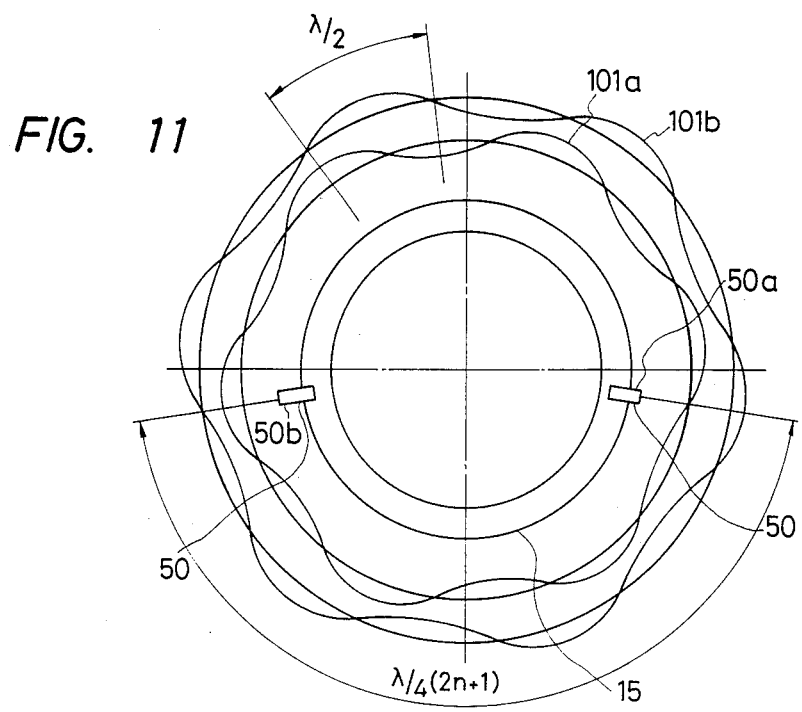
FIG. 11 illustrates a vibration mode of an anti-rotation member.

FIG. 11 shows a plan view of the vibration member 15 to which the anti-rotation members 50 are attached. The two anti-rotation members 50 are spaced by $2\frac{3}{4}\lambda$, where λ is the wavelength of the travelling wave generated in the vibration member 15. Numeral 101a denotes a travelling wave at a certain time, and numeral 101b denotes a travelling wave after a predetermined time period. For the travelling wave 101a, the anti-rotation member 50a is at a node of the travelling wave but the anti-rotation member 50b is at a loop of the travelling wave. After the predetermined time period, the travelling wave changes to 101b. At this time, the anti-rotation member 50a is at the loop of the travelling wave and the anti-rotation member 50b is at the node of the travelling wave 101b. The anti-rotation member which is usually a resistance to the travelling wave reflects the travelling wave or acts as the node of the vibration. When the spacing between the anti-rotation members is equal to n/2 (n: integer), the resistance to the travelling wave is high and the travelling wave is not efficiently propagated. In the present embodiment, since the spacing between the anti-rotation members 50a and 50b is not equal to λ/2, it does not happen that two or more anti-rotation members are simultaneously at the nodes of the travelling wave, and the travelling wave can be propagated without much resistance.

In the present embodiment, the spacing l between the contact points of the anti-rotation members and the vibration member is selected not to be equal to a multiple of nλ/2 (n: integer), where λ is the wavelength of the travelling vibration wave. Accordingly, a variation of the vibration resistance caused by the travel of the vibration wave (and hence a variation of the resonance point) can be averaged in the entire vibration member and minimized. The spacing l is selected regularly or at random for each vibration wave motor. Since the vibration resistances of the vibration member at the contact points of the anti-rotation members and the vibration member vary between a minimum and a maximum at a period of λ/2, where λ is the wavelength of the travelling vibration wave, the contact points are spatially arranged to shift the variation phase of the contact points. Preferably, the spacing l is set to l=nλ/4 (n: odd number).

Figure 1:
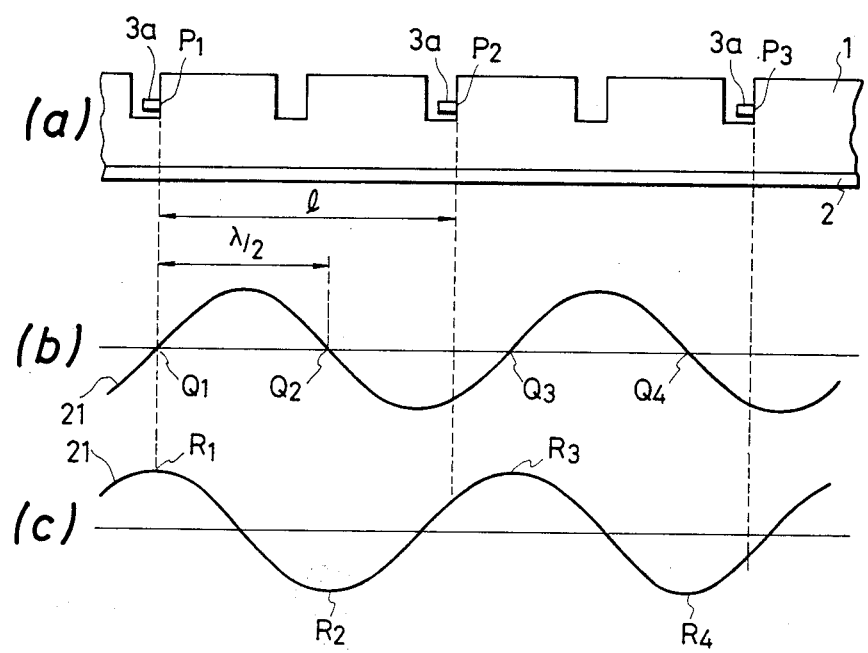
FIG. 1 shows a chart to explain the construction and operation of a vibration wave motor of the present invention.

In the embodiment of FIG. 1, the spacing between the anti-rotation pawls is constant. Alternatively, the pitch may be randomly set and although a rotor type motor is shown, the present embodiment is also applicable to a linear motor.

In the vibration wave motor of the present invention, the vibration member is of comb shape and the anti-movement members are fitted to the slits of the comb, and the spacing l between the contact points of the slits and the anti-movement members is selected not to be equal to a multiple of nλ/2 (n: integer), where λ is the wavelength of the travelling vibration wave. Accordingly, the variation of the vibration resistance of the vibration member which affects the travelling vibration wave is suppressed to a minimum. Since the vibration member is prevented from movement by the plurality of contact points, a stress applied to the vibration member is dispersed and the affect to the vibration of the vibration member is further suppressed.

In accordance with the present invention, the slits of the comb-shape structure of the elastic member, which are effective to amplify the vibration of the elastic member may also be used as engaging members for the anti-movement means of the vibration member, such as anti-movement pawls, and recesses which have been formed in the vibration member for the engagement with the stator are no longer necessary. Accordingly, a plurality of functions are simultaneously attained by a relatively simple structure with a relatively small number of manufacturing steps.

When the movable member of the vibration wave motor receives a high load, rigid anti-movement means for the vibration member is realized by the structure of the vibration member of the present invention as compare with the prior art motor in which a thin anti-movement member is bonded to the vibration member. Further, since the anti-movement member is mechanically engaged, the strength on the bonding surface is not lowered by aging or temperature changes, and the reliability and durability of the device are improved.

We claim:

1. A vibration wave motor for driving a movable member by a travelling vibration wave having a wavelength λ generated in a vibration member by applying a periodic voltage to a phasically arranged or polarized electromechanical energy transducer, comprising:

anti-movement means contacting said vibration member at a pitch not equal to a multiple of nλ/2, where n is an integer.

2. A vibration wave motor according to claim 1 wherein said pitch is equal to nλ/4, where n is an odd number.

3. A vibration wave motor according to claim 1 wherein said vibration means has a plurality of slits normal to the direction of travel of the vibration wave, and said anti-movement means engages the slits at said pitch.

4. A vibration wave motor according to claim 1 wherein said vibration member is of a ring shape.

5. A vibration wave motor according to claim 1 wherein said electro-mechanical energy transducer is an electrostrictive element.

6. A vibration wave motor according to claim 1 wherein said electro-mechanical energy transducer is a piezoelectric element.

7. A vibration wave motor for driving a movable member by a travelling vibration wave having a wave length λ generated in a vibration member by applying a periodic voltage to a phasically arranged or polarized electro-mechanical energy tranceducer, comprising:

(a) said vibration member having a plurality of slits normal to the direction of travel of the vibration wave; and (b) anti-movement means contacting said vibration member to engage the slits.

8. A vibration wave motor comprising:

(a) electro-mechanical energy conversion elements;

(b) a vibration member for generating a travelling wave when an electrical signal is applied to said conversion elements, said vibration member having one surface thereof divided into a plurality of perpendicular extended projections from a plane of another surface of said vibration member; and (c) anti-movement means contacting the projections of said vibration member for preventing the movement of said vibration member.

9. A vibration wave motor according to claim 8, wherein said vibration member is of a ring shape.

10. A vibration wave motor according to claim 9, wherein said anti-movement means is of a ring shape.

11. A vibration wave motor according to claim 10, wherein said anti-movement means have at least one projection engaged with the projection of said vibration member.

12. A vibration wave motor according to claim 11, wherein the projection of said anti movement means is inserted between projections of the vibration member.

* * * * *